Sept. 30, 1969  J. D. COCCOLI ET AL  3,469,922
GAS RING LASER GYROSCOPE SYSTEM
Filed March 27, 1967  3 Sheets-Sheet 1

INVENTORS:
JOSEPH D. COCCOLI
DUSAN A. KOSO
ATTORNEY: ARTHUR A. SMITH, JR.

Sept. 30, 1969  J. D. COCCOLI ET AL  3,469,922

GAS RING LASER GYROSCOPE SYSTEM

Filed March 27, 1967  3 Sheets-Sheet 3

INVENTORS:
JOSEPH D. COCCOLI
DUSAN A. KOSO

ATTORNEY: Arthur A. Smith, Jr.
ARTHUR A. SMITH, JR.

Sept. 30, 1969   J. D. COCCOLI ET AL   3,469,922
GAS RING LASER GYROSCOPE SYSTEM
Filed March 27, 1967   3 Sheets-Sheet 3

INVENTORS:
JOSEPH D. COCCOLI
DUSAN A. KOSO

ATTORNEY: *Arthur A. Smith, Jr.*
ARTHUR A. SMITH, JR.

United States Patent Office 3,469,922
Patented Sept. 30, 1969

3,469,922
GAS RING LASER GYROSCOPE SYSTEM
Joseph D. Coccoli, Brighton, and Dusan A. Koso, Cambridge, Mass., assignors to Massachusetts Institute of Technology, Cambridge, Mass., a corporation of Massachusetts
Filed Mar. 27, 1967, Ser. No. 626,198
Int. Cl. G01b 9/02; H01s 3/00; G06f 15/50
U.S. Cl. 356—106                 12 Claims

ABSTRACT OF THE DISCLOSURE

A gyroscope system for measuring the inertial orientation of a maneuvering base with a resolution appreciably less than earth rate. The system rotates a gas ring laser at a constant inertial angular reference velocity and determines the relative angular motion between the laser and the base. By then computing the difference between the relative motion and a stored reference rate, the system provides a measure of the rotation angle of the base.

---

The invention described herein was made in the performance of work under a National Aeronautics and Space Administration contract and is subject to the provisions of Section 305 of the National Aeronautics and Space Act of 1958 Public Law 85–568 (72 Stat. 435; 42 U.S.C. 4257).

BACKGROUND OF THE INVENTION

Field of the invention

This invention relates generally to gyroscopes and particularly to an improved gas ring laser gyroscope system.

Description of the prior art

Although they are relatively new instruments, the structure and many operational features of gas ring laser gyroscopes are described in the literature. For example, many of the salient features of this type of gyroscope are described by Philip J. Klass in an article entitled "Laser Unit Challenges Conventional Gyros," which appears in Aviation Week and Space Technology, McGraw-Hill, vol. 85, No. 11, Sept. 12, 1966. A similar description is also given in an article entitled "News in Focus," which appears in Laser Focus, vol. 2, No. 19, October 1966.

Briefly stated, the gas ring laser used as a gyroscope comprises an optical resonant channel containing an amplifying gas that maintains two oppositely directed beams of coherent light waves that travel over identical circuital paths. When the instrument is not rotating, the path lengths are equal and the beams have a common frequency. With rotation, however, the path lengths in inertial space traveled by the two beams to return to the same point in the channel differ and the resonant frequencies of the beams are oppositely shifted. The difference between the frequencies of the two beams, called the beat frequency, is a function of the rotational rate of the instrument. This beat frequency is measured by detecting the time-varying amplitude changes of the fringe pattern generated when the two beams are combined on an external optical detector. A fringe is adjusted in breadth to cover the entire detecting surface.

Although there is correlation between beat frequency and input rate over a broad range, it is generally not a linear relation, particularly at low rates of rotation ranging from earth rate down. Scattering of radiation between the two contratraveling beams provides a coupling mechanism between them which results in this non-linear relation. At very low rotation rates, the oppositely directed beams couple completely so that there is no frequency shift between them. An analogous type of frequency pulling and locking occurs in klystrons at microwave frequencies, as explained by J. C. Slater, Microwave Electronics, D. Van Nostrand Co., Inc. 1959. Thus, once the rotation rate falls below a critical threshold value, usually at rotation rates in the order of, or less than, one eru., a dead-band is created within which a beat frequency no longer exists.

Consequently, despite the inherent advantages of the gas ring laser as a gyroscope, such as the absence of mass-unbalance problems at high accelerations, minimum warm-up time, low power requirements, high resolution, compact packaging, and the like, it has not been competitive at low rates with the more conventional electrochemical gyroscope.

Some attempts have been made to overcome this problem by introducing a fixed bias into the instrument such that a beat frequency will be produced even though the base to which the instrument is attached may be rotating at a rate appreciably below earth rate. One approach has been to use a constant speed motor to rotate the instrument. However, the rotation rate chosen for the laser must be higher than the highest expected rotation rate of the base to which it is attached. Another approach has been to place biasing elements, such as Faraday bias cells or Fresnel effect devices, in the optical path in order to separate artificially the frequencies of the contra-traveling beams. Since the resulting beat frequency comprises a bias component and a component of base rotation, the bias (whether real or artificial) must be maintained to within the same extremely close tolerances specified as the resolution required for base rotation measurement. However, due to the additional error sources introduced through the properties and stabilities of the biasing devices, such accuracy has been impossible to attain.

Another approach has been to oscillate the laser through a very small angle at a fairly high rate so as to obtain a continuously changing bias of known amplitude and frequency. Basic handicaps of this latter technique appear to lie in the fact that during two intervals in each cycle of oscillation, the angular velocity (rotation rate) of the laser falls below the natural lock-in threshold, during no information on rotation can be obtained, and the amplitude of oscillation must be held to extremely close tolerances because of the highly non-linear portion of the beat frequency curve that such devices must operate in.

Further, in all of the above attempts the beat frequency is allowed to change as a function of changes in base rotation rate since the laser is attached to the base and responsive to the movements thereof around its sensitive axis. These changes may occur within broad limits. Since, as previously noted, the correlation between beat frequency and input rate over a broad range is generally non-linear, appreciable errors could result even if the biasing were very accurately controlled.

SUMMARY

In view of the foregoing limitations in the use of the gas ring laser gyroscope, it is a general object of the invention to provide an improved gas ring laser gyroscope system having accuracies equal to ar better than those supplied by the more conventional electromechanical gyroscope.

It is another general object of the invention to provide an improved gas ring laser gyroscope system capable of measuring angular rotation of a base with a resolution many orders of magnitude less than earth rate.

It is a still further object of the invention to provide an improved gas ring laser gyroscope system which will be capable of providing to within close tolerances a measure of the laser inertial angular rotation relative to which angular rotation of a maneuvering base coupled thereto may be precisely determined.

It is a still further object of the invention to maintain the output of the gas ring laser at a constant predetermined beat frequency independent of rotations of the base to which the laser is coupled.

These and other objects are met by a gas ring laser gyroscope system that continuously operates to maintain a constant reference angular inertial rotation rate irrespective of rotations of the base to which the laser is coupled. Thus, the rotated laser provides a very accurate orientation reference relative to which the rotation angle of the base may be accurately determined. (By "inertial rotation rate" as used throughout the specification and claims is meant rotation rate relative to a non-rotating, non-accelerating frame in inertial space.)

Briefly, the system comprises a rotatable gas-filled ring laser which is coupled to a maneuverable base and which produces an instantaneous beat frequency in response to the instantaneous rotation rate of the laser; an electro-optical bias rotation feedback loop which operates to maintain laser rotation at the aforementioned reference rate by continuously acting to minimize the difference between the measured instantaneous beat frequency and a reference beat frequency corresponding to the aforementioned reference rate; an encoder for measuring the instantaneous angular rotation rate of the laser relative to its base; and a comparing unit which continuously compares the laser-relative-to-base rotation rate with a reference laser-relative-to-base rotation rate, and produces a difference signal corresponding to the instantaneous inertial angular orientation of the base.

Further, the system comprises a stabilization subsystem which acts to prevent drifts in beat frequency over extended periods of time caused by environmental factors other than laser rotation rate. Such stabilization is necessary since the aforementioned bias rotation feedback loop operates on the assumption that the measured beat frequency is solely indicative of and directly corresponds to laser angular rotation rate. As will be explained, the properties requiring stabilization include the single pass gain and mode number of the laser gas, the detuning of the laser's optical frequency, and the relationship between the D-C discharge currents within the laser channel.

Further objects, features and advantages of the present invention and a better understanding thereof will become apparent with the following detailed description taken in conjunction with the accompanying drawings.

DRAWINGS

PREFERRED EMBODIMENT

Figure 1:
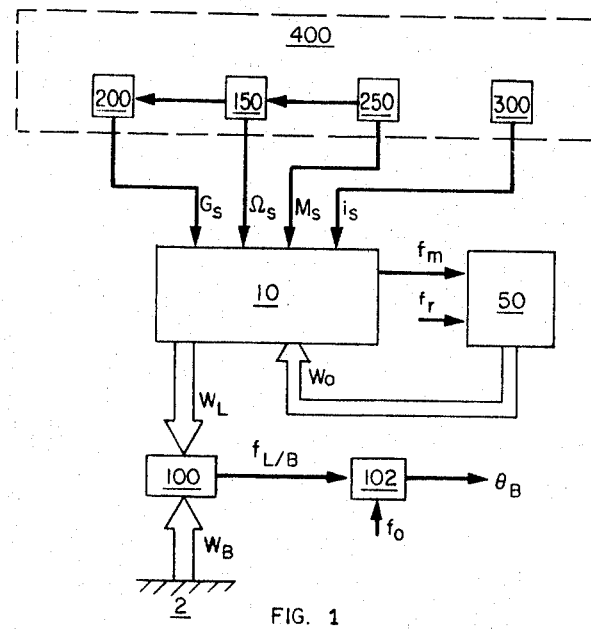
FIG. 1 is a functional block diagram of the invention showing the relationship of the various components and subsystems thereof.

As noted in the functional block diagram of FIG. 1, the laser gyroscope system basically comprises rotatable gas ring laser 10 physically coupled to base 2, electro-optical bias rotation feedback loop 50, encoder 100, subtracting unit 102, and stabilization subsystem 400.

Briefly, laser 10 produces an electrical instantaneous beat frequency output signal $f_m$ which depends on the instantaneous inertial angular rotation rate $W_L$ of the laser about its sensitive axis. Beat frequency signal $f_m$ is compared in loop 50 with an electrical reference beat frequency signal $f_r$ which corresponds to a constant laser reference inertial angular rotation rate $W_0$. The resulting difference signal between beat frequency signals $f_m$ and $f_r$ is converted into mechanical energy and used to rotate laser 10 at an angular rotation rate to reduce the difference between beat frequency signals $f_m$ and $f_r$ to zero, thereby operating to maintain laser rate $W_L$ at laser reference rate $W_0$. Encoder 100 continuously measures the angular rotation rate of laser 10 relative to the angular rotation rate of base 2 and generates a proportional signal $f_{L/B}$. (As aforementioned, through the operation of loop 50, laser rate $W_L$ equals laser reference rate $W_0$.) Signal $f_{L/B}$, in turn, is continuously compared by comparing unit 102 with reference signal $f_0$ which, as will be explained, is the value of signal $f_{L/B}$ when laser rate $W_L$ equals laser reference rate $W_0$ and base rate $W_B$ equals zero. A difference signal $\theta_B$ is generated by comparing unit 102 and is the instantaneous inertial angular orientation of base 2. Difference signal $\theta_B$ is fed to a computing means (outside the scope of this invention).

The accuracy of the aforementioned scheme depends on a direct monotonic correspondence between beat frequency $f_m$ and laser rate $W_L$. It has been determined, however, that beat frequency $f_m$ is affected by a number of other environmental factors. Some of these factors, such as temperature, direction, axis wobble, dust, atmospheric density, and the like, are effectively eliminated by good design techniques known in the art. Other, more serious, factors exist, which have not been resolved in the prior art and which are crucial to the accuracy of the gas ring laser gyroscope system over extended periods of time. As will be explained, beat frequency $f_m$ is also a function of the single pass gain of the laser gaseous medium, of the detuning (i.e., the difference frequency between the resonant optical frequency of the laser channel and the atomic line center of the laser spectral line), of the mode number in which the laser is operated, and the balancing of the D-C discharge currents in the discharge arms of the laser channel. Stabilization of these four phenomena is therefore necessary.

The desired stabilization is effected through subsystem 400 comprising optical frequency detuning stabilization ($\Omega_s$) loop 150, single pass gain stabilization ($G_s$) loop 200, mode number stabilization ($M_s$) loop 250, and D-C discharge current stabilization ($i_s$) loop 300.

Each of the aforementioned units of the laser gyroscope system will now be explained and described in more detail.

Figure 2:
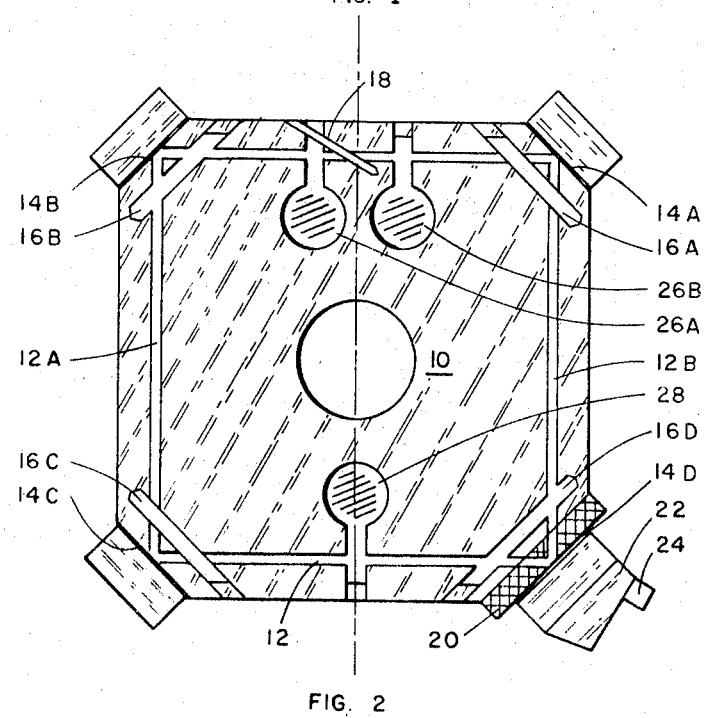
FIG. 2 is a cut-away top view of the gas ring laser used in the invention.

The particular gas ring laser configuration used in subject invention is shown in FIG. 2. As noted therein, laser 10 is machined from a rectangular block of transparent solid fused quartz. Internal to the block is resonant channel 12 comprising symmetrically disposed discharge arms 12A and 12B and forming a closed optical path. Discharge arm 12A corresponds to the shorter path of channel 12 connecting cathode 28 and anode 26A; while discharge arm 12B corresponds to the shorter path of channel 12 connecting cathode 28 and anode 26B. Dielectric film mirrors 14A through 14D (each comprising a quartz substrate and dielectric film surface) are mounted at each corner thereto. The length of channel 12 is designed such as to support only a single longitudinal mode of a twin neon isotope helium-neon laser. (Channel 12 is 25 to 30 centimeters long and has a diameter of 1 to 2 millimeters.) Channel 12 is filled with a helium/neon mixture in the ratio 5:1 at a total pressure of 3 torr. The mixture comprises isotope helium-3 and equal amounts of isotopes neon-20 and neon-22. (The neon isotopes are the lasing or active isotopes.) Bypasses 16A through 16D for gas discharge are provided adjacent to each mirror, and large ballast reservoirs (not shown) are provided to minimize pressure changes due to clean-up and outgassing. Further, Brewster plate 18 is used in channel 12 to eliminate any induced circulation flow of the laser gas.

At one corner of channel 12 is located piezoelectric transducer 20, combining optics 22 and photocell detector 24. An aperture is provided in the center of laser 10 for mounting purposes as will be explained later.

The laser gaseous medium is excited by the application of a D-C voltage between anodes 26A and 26B and cathode 28, producing two contratraveling light beams within channel 12. A small portion of the light from each of the two contratraveling light beams incident on dielectric mirror 14D is allowed to pass through the mirror to combining optics 22. The two beams are combined so as to be nearly parallel. A wave front interference is thus produced which, in turn, generates a fringe pattern of light and dark bars that move past detector 24. The detector dimensions are less than the fringe spacing. Thus, the rate at which the fringe pattern passes detector 24 is the laser beat frequency output.

Figure 3:
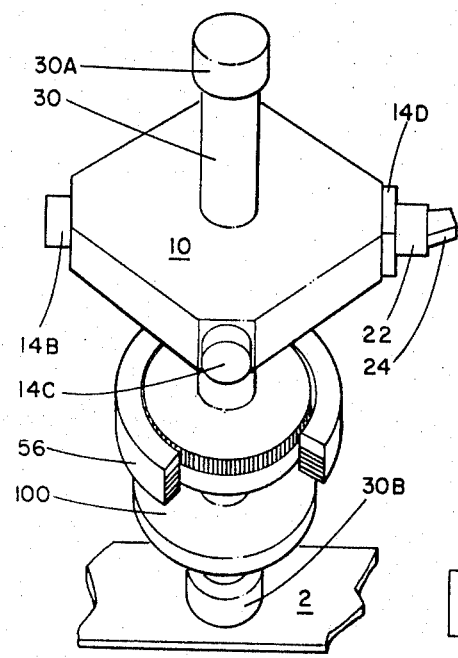
FIG. 3 is a perspective view showing the coupling of the laser of FIG. 2 to its base.

FIG. 3 illustrates the coupling of laser 10 to base 2. As shown in FIG. 3, laser 10 is coupled to base 2 via shaft 30 having end bearings 30A and 30B such that laser 10 is free to rotate about its sensitive axis relative to rotations of base 2. Also mounted on shaft 30 are torquer 56 and encoder 100.

Figure 3A:
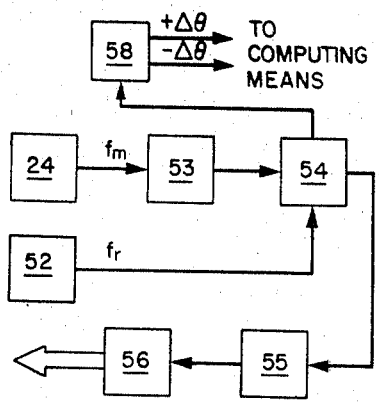
FIG. 3A is a functional block diagram of the electro-optical bias rotation feedback loop.

Beat frequency $f_m$ generated by rotation of laser 10 is produced by detector 24 and continuously monitored by bias rotation loop 50 shown in FIG. 3A. As noted therein, loop 50 is an electro-optic feedback loop comprising preamplifier 53 which amplifies beat frequency $f_m$, oscillator 52 which is adjusted at reference beat frequency $f_r$ (corresponding, as aforementioned, to laser reference rate $W_o$), and phase-sensitive detector 54 which compares beat frequencies $f_m$ and $f_r$ and generates a difference signal. This difference signal is amplified via amplifier 55 and fed to torquer 56 which rotates shaft 30 of FIG. 3 and hence laser 10 at an angular rate to reduce the difference between beat frequencies $f_m$ and $f_r$ to zero. (Possible one-beat errors resulting from transient 360-degree phase shifts between beat frequencies $f_m$ and $f_r$ are derived from up-down conuter 58, which monitors the aforementioned difference signal from phase-sensitive detector 54, and are later multiplied in the computing means with the output from comparing unit 102 of FIG. 3B.)

Figure 3B:
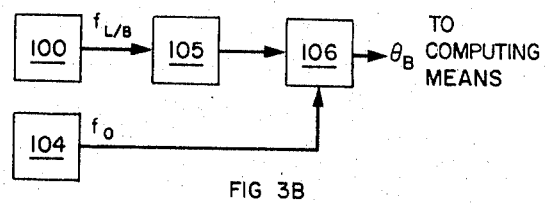
FIG. 3B is a functional block diagram of the encoder and the comparing unit used in the invention.

Signal $f_{L/B}$ is continuously generated by encoder 100 and fed to comparing unit 102 shown in FIG. 3B. As noted in FIG. 3B, signal $f_{L/B}$ is amplified in preamplifier 105 and compared in phase-sensitive detector 106 with reference signal $f_o$ from computer clock 104. The resulting difference signal, $\theta_B$, from detector 106 is fed to the computing means. (As noted previously, signal $\theta_B$ is the instantaneous inertial rotation angle of base 2.)

The procedure for establishing reference beat frequency $f_r$ is as follows: Initially, bias rotation loop 50 of FIG. 3A is open. The sensitive axis of laser 10 is established orthogonal to the earth's axis of rotation, such that base 2 has a zero component of inertial rotation about the laser's sensitive axis. (At this time, the temperature of laser 10 is set at a desired value and the loops of stabilization subsystem 400, to be described, are closed to ensure long-term accuracy.) Reference signal $f_o$ (which is chosen to correspond to a laser reference rate $W_o$ sufficiently high to prevent operation below or near the natural lock-in threshold of laser 10) is then stored in computer clock 104 of FIG. 3B. (At no point in this calibration procedure nor in subsequent operation of the laser gyroscope system is it necessary to know with extreme accuracy the actual value of laser reference rate $W_o$.) Laser 10 is then rotated relative to non-rotating base 2 via torquer 56 (controlled by an external power source, not shown) until signal $f_{L/B}$ from encoder 100 corresponds with reference signal $f_o$ from clock 104. Correspondence is indicated by a zero output from detector 106 of FIG. 3B. Laser 10 is now rotating at laser reference rate $W_o$. Simultaneously, oscillator 52 of FIG. 3A is adjusted at the then-observed beat frequency $f_m$ from detector 24 since, in this case, beat frequency $f_m$ corresponds to laser reference rate $W_o$ and hence is used as the reference beat frequency $f_r$. Bias rotation loop 50 is then closed, and base 2 is allowed to rotate freely. Once established, the angular rotation rate of laser 10 is maintained at laser reference rate $W_o$ by the operation of bias rotation loop 50 as previously described.

As previously mentioned, the purpose of stabilization subsystem 400 of FIG. 1 is to ensure that beat frequency $f_m$ from detector 24 remains solely indicative of laser rate $W_L$. It has been observed, however, that despite the initial establishment and maintenance of laser 10 at laser reference rate $W_o$, drifts in beat frequency will occur with changes in optical frequency detuning, single-pass gain of the gaseous medium, mode number, and with changes in the difference between the D-C discharge currents in arms 12A and 12B of laser channel 12 of FIG. 2. If unstabilized, these factors eventually add an undetermined and non-linearly varying component to beat frequency $f_m$. Hence, in attempting to effect a correspondence between beat frequency $f_m$ and reference beat frequency $f_r$, the signal generated by bias rotation loop 50 erroneously causes laser rate $W_L$ to vary such that laser reference rate $W_o$ is no longer maintained over extended periods of operation. The net result is that laser rate $W_L$ varies despite the maintenance of a constant beat frequency via bias rotation loop 50. A thorough discussion of the differential frequency shifts of the ring laser can be found in "A Scheme for Precision Angular Stabilization Using Ring Lasers" by J. David Coccoli and D. Alexander Koso, Instrumentation Laboratory, Massachusetts Institute of Technology, Report E–1943, Revision 1, August 1966.

As explained in the aforementioned report and in an article by W. R. Bennett, Jr. entitled "Hole Burning Effects in an He-Ne Optical Maser" which appears in Physical Review, vol. 126, No. 2, Apr. 15, 1962, the excited laser states of neon of the helium-neon mixture create a non-linear dependence of the index of refraction of the optical resonant frequency of the laser. This is based on the commonly known physical principle that the velocity of light in a given medium and hence the refractive index of the medium varies with frequency in the vicinity of atomic resonances. The phenomenon is termed dispersion. The nature of this variation is generally non-linear. More specifically, with the application of the active gas to the laser channel, the resonant frequencies of the two contratraveling ring laser light beams (corresponding to the resonant optical frequencies of the empty rotating channel) are caused to shift, generally by slightly different amounts. Hence the frequency difference between the two resonant frequencies is no longer indicative only of rotation rate, but includes a component caused by refractive dispersion. Consequently, if the resonant optical frequency of the channel and hence the resonant frequencies of the two contratraveling ring laser light beams is allowed to vary with changes in channel length, temperature and the like, the result generally will be a small drift in the beat frequency over an extended period of time. As previously explained, the net result is that attempts to maintain a constant beat frequency will achieve the undesired end of producing a varying laser rotation rate.

To overcome the phenomenon of dispersion dependent response, the detuning must be stabilized, i.e., the optical resonant frequency of laser 10 must be maintained at some optimum, fixed distance from the atomic line centers of the neon isotopes used in the laser medium. For simplicity of analysis, improved stability, and best depth of modulation, it is preferred that the oscillation frequency be maintained at some frequency difference larger than the collision broadened atomic line width from the neon atomic line center in order that the intensities of the two contratraveling waves become nearly equal, i.e., each beam independently saturates the gain curve. As previously noted, the preferred laser configuration used in subject invention employs an equal mixture of neon-20 and neon-22 isotopes, operating near zero detuning, where the term "detuning" in such a mixture is here defined to mean the frequency separation from the single pass common (unique) gain point of the twin isotope system.

Figure 4:
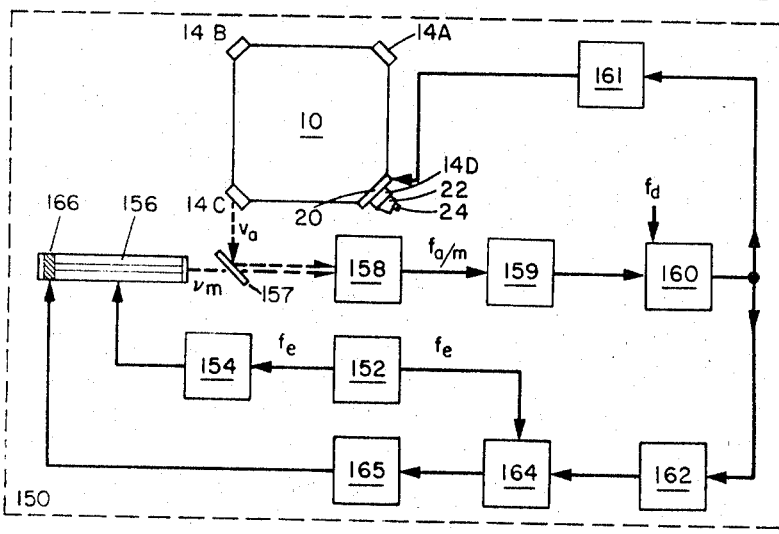
FIG. 4 is a functional block diagram of the optical frequency detuning stabilization loop.

The optical frequency detuning of ring laser 10 is stabilized via the electro-optic feedback loop of FIG. 4 at the optical frequency of the common gain point of the two neon isotopes used in the laser medium. (The particular loop of FIG. 4 is a modified version of a loop described by W. R. Bennett et al. in Applied Physics Letters, vol. 5, No. 3, Aug. 1, 1964.) As noted in FIG. 4, the optical frequency $\nu_m$ of one beam of straight laser 156 is caused to vary between limits by modulating the laser gain at modulation frequency $f_e$ via oscillator 152 and power supply 154. The variation in frequency is detected by beating the frequency modulated output of laser 156 with the unmodulated output $\nu_a$ of ring laser 10 on the surface of photodetector 158. Frequencies $\nu_a$ and $\nu_m$ are incident on photodetector 158 in parallel via beamsplitter 157. (Frequency $\nu_a$ at 6328 A. is initially displaced from frequency $\nu_m$ by a value $f_d$ chosen here to be one megacycle per second [mc./s.].) The resulting heterodyned signal $f_{a/m}$ is amplified via amplifier 159 and applied to U.H.F. discriminator 160 which is centered at the aforementioned electrical frequency $f_d$ of one mc./s. The output of discriminator 160 has a D-C component which is zero when the mean separation between the two laser optical frequencies is one mc./s., and an A-C component which depends on the detuning of straight laser 156 and its relative excitation. The term "mean separation" as used herein refers to a time average encompassing a large number of cycles of modulation frequency $f_e$. The A-C component goes to zero at the common gain point (zero detuning) of laser 156. The D-C component is amplified via amplifier 161 and causes transducer 20 to change the dimensions of ring laser 10 such that the desired mean frequency separation value is maintained at one mc./s. At such time, the D-C component of the discriminator output becomes zero. The A-C component, representing the instantaneous synchronous beat frequency difference from the specified mean one mc./s. separation is amplified by amplifier 162 and compared with the modulation phase in phase-sensitive detector 164. The resulting error signal is amplified via amplifier 165 and caused to excite transducer 166, thereby driving the channel length of laser 156 towards resonance at the common gain point of the two neon isotopes. The aforementioned frequency variation vanishes at the optical frequency of this common gain point (zero detuning). The A-C loop, therefore, is used to establish and maintain the optical frequency of laser 156 at the common gain point of the twin neon isotope system, while the D-C loop is used to stabilize the detuning of ring laser 10. Lasers 156 and 10 are tied to a common gas reservoir (not shown) to eliminate any pressure-dependent shifts of the common gain points of the lasers relative to each other, e.g., Stark shift.

Since the index of refraction of the laser gas is also a function of the relative excitation of the laser, drifts in beat frequency will occur over extended periods of time due to changes in the relative excitation. The relative excitation, in turn, is affected by drifts in the single pass gain of the laser medium, and by losses via the reflective mirrors. Since the mirror losses are expected to remain constant within reasonable time limits, the effects of drifting relative excitation may be compensated for through adjustment of the single pass gain of the laser medium.

Figure 5:
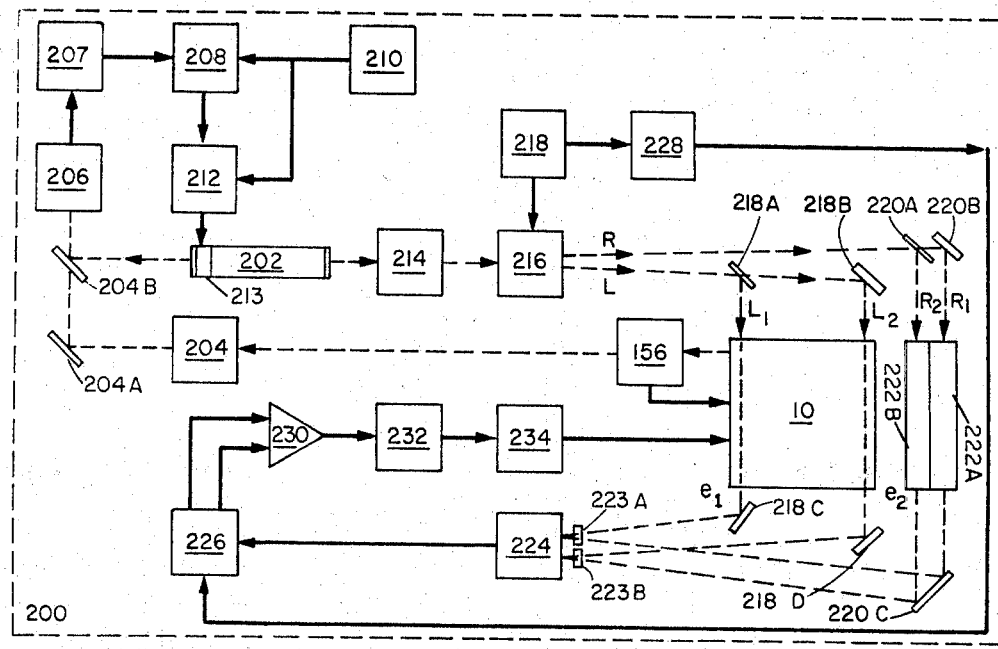
FIG. 5 is a functional block diagram of the single pass gain stabilization loop.

The single pass gain of the laser medium is maintained constant through the electro-optic feedback loop of FIG. 5. The oscillating optical frequency of a single mode straight laser 202 is stabilized at a frequency difference from the operating optical frequencies of ring laser 10 of at least the collision broadened atomic line width of the 6328 Angstrom transition of neon. This will prevent the beam from laser 202, which eventually enters the optical channel of ring laser 10, from strongly interacting with those atomic states in the inverted neon population of laser 10 that are supporting the ring laser optical oscillations.

The beam from laser 202 is stabilized in frequency by comparing it with the stable optical frequency of laser 156 (from the detune stabilization loop of FIG. 4). The laser light from laser 202 is polarized at an angle of 90 degrees spatially with respect to the laser light generated by ring laser 10. This further reduces the interaction between the oscillations of the channels of ring laser 10 and laser 202. This also presents a lower reflection coefficient of the ring laser mirrors to the light incident from laser 202. The light from laser 156 must be rotated 90 degrees in polarization by optical rotator 204 because the polarization of laser light from laser 156 is the same as the polarization of ring laser 10 (see FIG. 4). Optical rotator 204 is a half-wave plate whose principal optical axes are at 45 degrees to the incident laser light from laser 156. After the light from laser 156 is rotated in polarization, it is reflected from mirror 204A, passed through beam splitter 204B, and is then combined with light from laser 202 on optical detector-mixer 206 to develop a frequency difference signal which is amplified via amplifier 207 and fed to discriminator 208. The center frequency of discriminator 208 is set to the desired frequency difference between laser 202 and ring laser 10. This difference has been chosen as 400 mc./s.±5 mc./s., which not only satisfies the condition of being greater than a collision broadened linewidth of the 6328 Angstrom transition of neon in the ring laser, but also allows the beam from laser 202 to pass through ring laser 10 at a frequency near the frequency at which a maximum in the single pass gain of the ring laser 10 medium occurs. Further, this allows laser 202 to be operated with the less costly, normally occurring isotope mixture of neon (which is predominantly neon-20) and provides an additional advantage because the maximum intensity of the output of laser 202 occurs approximately 400 mc./s. below the frequency of operation of ring laser 10.

Modulator 210 modulates the output of high voltage supply 212 at a fixed frequency (audio) and amplitude. The resulting output, in turn, modulates the dimensions of piezoelectric transducer 213 such that the optical channel length of laser 202 is modulated, producing a modulation of the optical frequency of laser 202 by an amount chosen nominally as (but not to exceed) ±5 mc./s. Modulator 210 is also applied to the sign selection of the output of discriminator 208. For example, if the signal developed in discriminator 208 is out of phase with the modulator signal and if the coefficient of piezoelectric transducer 213 is negative, then the output of the discriminator should be positive for optical mixing frequencies greater than 400 mc./s. and negative for optical mixing frequencies less than 400 mc./s. This is because laser 202 contains a normal isotopic mixture of neon which is predominantly neon-20 with an atomic line center that falls below the common gain point frequency of ring laser 10, thus accounting for the sign dependence of the output of discriminator 208 on the relative phase of modulator 210 and on the signal developed by discriminator 208.

A beam of light from frequency-stabilized laser 202 is passed through lenses 214. (The lenses shape and focus the light beam so as to enable its efficient passage through the various apertures to be described.) After passing through the lenses, the beam is incident on electro-optic deflector 216. This deflector may be one of several optically transparent crystals, such as BaTiO$_3$, whose extraordinary index of refraction has a strong dependence on externally applied electric fields at temperatures above the Curie point of the crystal. The applied electric field in the preferred embodiment is a square wave in time and is supplied by modulator 218. In the present application, the frequency of operation of modulator 218 should be a factor of at least ten less than that of modulator 210 in order that small-intensity variations due to the slight frequency modulation of laser 202 will be sufficiently averaged out. Electro-optic deflector 216 alternately directs the laser beam along two separate paths, labelled L and R in FIG. 5.

When the beam is directed along path L, it is approximately equally divided by beam splitter 218A into two beams, labelled $L_1$ and $L_2$. Beam $L_2$, in turn, is reflected from mirror 218B such that both beams are parallel. Each of these two beams is directed to pass through a different discharge arm of ring laser 10 in order to sample the gain of the laser medium in each of the separate discharges. Beam R is divided by beam splitter 220A approximately equally into two beams $R_1$ and $R_2$. Beam $R_1$ is reflected from mirror 220B such that both beams are parallel. Beams $R_1$ and $R_2$ are then passed through reference attenuators 222A and 222B respectively. (The beam diameters have been previously adjusted by lenses 214 to a minimum spot size at the points of incident entrance to the optical cavity of ring laser 10.) Beams $L_1$ and $L_2$ make a slight angle (of the order of 5 to 10 arc minutes) with the optical beam of ring laser 10 within the laser channel. This is necessary to prevent multiple reflections of beams $L_1$ and $L_2$ around the optical channel of the ring laser. These multiple reflections could cause an additional reduction in the intensities of beams $L_1$ and $L_2$ through destructive interference at the exit points $e_1$ and $e_2$ of ring laser 10. This angle is also necessary to prevent ring laser 10 beams from reaching optical detector 224. The mirrors of ring laser 10 are coated for optimum reflectivity at the angle of incidence of the internal ring laser traveling waves (in this case 45 degrees) and for the polarization of these waves. Since the beams $L_1$ and $L_2$ are externally incident to the ring laser channel and therefore incident at the mirror reflecting surface from within the quartz substrate of the laser mirrors, the angles of incidence at the reflecting surfaces will be 27 degrees due to refraction. As a result of the polarization and angle of incidence of beams $L_1$ and $L_2$, the reflectivities experienced by these beams in entering ring laser 10 will be somewhat less than the reflectivities experienced by the laser beam at these same mirror surfaces. The reflectivities of the laser mirrors are chosen to be the lowest value for which ring laser 10 will operate satisfactorily at the optical frequency of the common gain point with the neon inversion population saturated. (Inversion saturation occurs at a sufficiently large discharge current, that is, electron density whereby electron collisions with the excited neon atoms compete with the laser transition as a mechanism for depopulating the upper laser state.) In this way the single pass gain curve saturates at some maximum value and the optical dispersion of ring laser 10 becomes at least an order of magnitude less sensitive to external variables such as discharge current, gas temperature, and pressure. It is desirable to have the attenuation of beams $L_1$ and $L_2$ as small as possible. Thus, the emphasis is on the lowest reflectivity of laser mirrors that will allow successful ring laser operation. The desirability of having the attenation of $L_1$ and $L_2$ as small as possible is a consequence of the proportionality of the signal-to-noise ratio to $(l-r)^2$, where $r$ is the effective reflection coefficient of the laser mirrors to beams $L_1$ and $L_2$. Beams $L_1$ and $L_2$ in passing through ring laser 10 are attenuated by a factor $(L-r)^2$. A change in relative gain $(\delta G)/G$ produces an intensity variation at exit points $e_1$ and $e_2$ of $(l-r)^2$ $G(\delta G)/G$ per unit intensity of incident beams $L_1$ and $L_2$. This intensity change is measured by comparing the intensity of the beams of the L paths through ring laser 10 with the intensity of the corresponding R beams passing through reference attenuators 222A and 222B. The adjustment of these attenuators determines the gain required in the laser paths to produce equal intensities of the L and R beams at optical detector 224.

Beams $L_1$ and $L_2$ are reflected from spherical lenses 218C and 218D, respectively. These lenses, in turn, focus beams $L_1$ and $L_2$ into the optical detecting system but displace the ring laser beam away from the detector. This is made possible by the small angle set between the L beams and the beam of ring laser 10. Similarly, beams $R_1$ and $R_2$ are reflected from spherical lens 220C and focused into detector 224. The L and R beams pass through narrow band filters 223A and 223B at detector 224 to eliminate other sources of light occurring at other optical frequencies which might increase the noise level. The two beams, $L_1$ and $R_1$, are finally incident, alternately (at the switching frequency of modulator 218), on the same spot of the photosensitive surface of photodetector 224. Similarly, the two beams $L_2$ and $R_2$ are incident on a common spot of the photodetector surface. This eliminates effects of small independent time variations of the photosensitivity at different spots on the photosurface. The separation of $L_1$ and $L_2$ on the detecting surface prevents a redistribution of intensity due to interference effects which is undesirable since the L and R beams will then not have the same intensity distribution over the photosurface.

The response of photodetector 224 is synchronously detected with respect to the switching frequently of modulator 218 by synchronous detector 226, the output of modulator 218 having been first shifted in phase via phase shifter 228 to optimize the response of synchronous detector 226. The L and R signal outputs from detector 226 are compared in differential amplifier 230 and the resulting difference signal is integrated by integrator 232 to obtain a signal-to-noise ratio greater than unity for the desired resolution of $(\delta G)/G$. Since the signal-to-mean intensity ratio is constant for a constant $(\delta G)/G$ while the intensity of the noise-fluctuation-to-mean-intensity of the beam decreases as $(\text{intensity})^{-\frac{1}{2}}$, the signal-to-noise-fluctuation ratio is proportional to $(\text{intensity})^{\frac{1}{2}}$. Integration of the signal-to-means-intensity ratio yields a function increasing linearly with time, while integration of the noise-intensity-to-mean-intensity ratio yields a function which increases no faster than $(\text{time})^{\frac{1}{2}}$. Thus, the signal-to-noise ratio improves with integration as the square root of time. These basic principles and relationships are described in the literature, for example, in Principles of Noise, by J. J. Freeman, John Wiley and Sons, 1958. Integration times of the order of one minute are acceptable in view of the expected drift rates in power supplies and ring laser thermal environment.

The signal output of integrator 232 controls the gain of ring laser 10 by adjusting the discharge current via discharge power supplies 234. (The success of the aforementioned process depends on enclosing all optical paths in evacuated tubing.)

Figure 6:
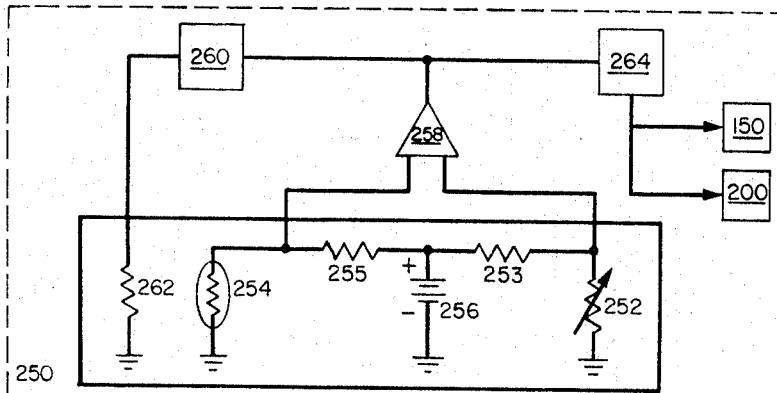
FIG. 6 is a functional block diagram of the mode number stabilization loop.

The channel dimensions of ring laser 10 and hence the mode number of the laser oscillations are temperature dependent. The electro-thermal loop of FIG. 6 is used to insure that the ring laser is continually operated in the same mode in which it was initially calibrated. In order to assure that this mode is present when the detuning stabilization loop of FIG. 4 is closed, the temperature of the ring laser block is constrained to be the same to within ±0.2 centigrade degrees each time that the laser is activated. The loop of FIG. 6 includes a basic bridge network, the current in one arm of which represents the reference laser block temperature, while the current in the other arm represents the actual laser temperature. The two temperatures are compared and a difference signal is used to reset the laser temperature such that it conforms, to within a set tolerance, to the reference temperature. Basically, the loop operates as follows. The desired temperature of the block prior to calibration is selected by adjusting resistor 252. (The ring laser temperature will be set several degrees warmer than the warmest external environment expected during the lifetime of the system between calibrations.) Thermistor bridge 254, which is mounted within ring laser 10, senses the actual temperature of the ring laser block. The resistance of thermistor 254 exhibits a higher degree of sensitivity to temperature changes than the other resistors in the bridge network. Resistors 253 and 255 are chosen such as to represent constant, identical resistances. Voltage is applied to the loop via source 256. The resulting outputs from both arms of the bridge network are compared in differential amplifier 258. The difference signal, which is proportional to the resistance bridge unbalance and hence to the temperature departure of the thermistor from the desired value, is amplified by power amplifier 260 and used to control the current through heater 262 in the laser block. When the bridge is balanced, the zero level indicator 264 supplies a signal to activate the detuning and gain stabilization loops of FIGS. 4 and 5.

Figure 7:
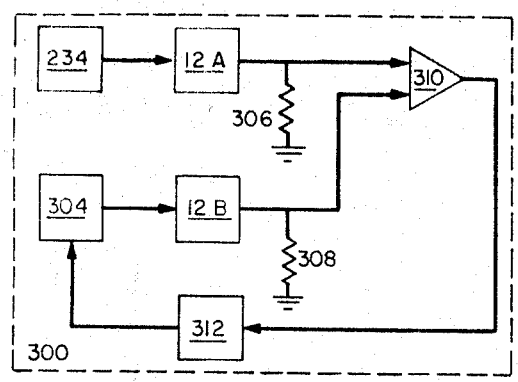
FIG. 7 is a functional block diagram of the D-C discharge current stabilization loop.

FIG. 7 illustrates the stabilization of the unbalance current between laser discharge arm 12A (from cathode 28 to anode 26A) and arm 12B (from cathode 28 to anode 26B) by detecting the difference in voltages developed across precision, temperature-compensated, resistors 306 and 308, respectively. The difference voltage is amplified by difference amplifier 310 and integrated in integrator 312 with a time constant of approximately one second. The output of integrator 312 drives power supply 304 to maintain the difference current in arms 12A and 12B constant within the specified resolution. Resistors 306 and 308 have the same values within .01% so that the unbalance discharge current will be no greater than .02% of the discharge current in either arm. The gain of difference amplifier 310 is such that the unbalance current resolution is one part in $10^6$ of current in either arm.

Although a specific rectangular, quartz laser configuration has been described, it is apparent that subject invention is applicable to any gas filled ring laser having an arbitrary closed optical path and producing a beat frequency in response to rotation of the laser.

The particular configuration described herein was chosen because of its excellent design features which help to minimize the various error producing environmental factors that act on a laser. Further, it is apparent that the specific components comprising the electro-optic feedback loops may be replaced by other, more sophisticated or streamlined configurations and yet still remain within the intended scope of the invention.

What is claimed is:
1. A laser gyroscope system for measuring the interial angular orientation, $\theta_B$, of a base, which comprises in combination:
 (a) a rotatable ring laser coupled to said base and free to rotate relative to said base, wherein said ring laser produces an electrical instantaneous beat frequency output signal, $f_m$, which depends on the instantaneous inertial angular rotation rate, $W_L$, of said ring laser, and wherein an electrical reference beat frequency signal, $f_r$, corresponds to a constant reference inertial angular rotation rate of $W_0$;
 (b) coupling means which operates to rotate said ring laser at said reference rate $W_0$;
 (c) an encoder for measuring the relative angular rotation rate of said ring laser and said base, and generating an output signal, $f_{L/B}$; and
 (d) comparing means for continuously comparing said signal $f_{L/B}$ with a reference signal $f_0$, corresponding to said signal $f_{L/B}$ when said ring laser is rotating at said reference rate $W_0$ and said base is non-rotating with respect to intertial space, thereby providing said angular orientation $\theta_B$ of said base.

2. The laser gyroscope system of claim 1 wherein said coupling means comprises in combination:
 (a) a comparator for comparing said instantaneous beat frequency $f_m$ with said reference beat frequency $f_r$ and generating a difference signal; and
 (b) a torquer responsive to said difference signal which rotates said ring laser at an angular rotation rate to reduce to zero the difference between said instantaneous beat frequency $f_m$ and said reference beat frequency $f_r$.

3. The laser gyroscope system of claim 1 wherein said comparing means comprises a computer clock for storing said reference signal $f_0$, and a phase-sensitive detector for comparing said reference signal $f_0$ with said signal $f_{L/B}$.

4. A laser gyroscope system for measuring the inertial angular orientation of a base, which comprises in combination:
 (a) a rotatable ring laser having a resonant optical channel with a first discharge arm and a second discharge arm, wherein said channel contains a gaseous lasing medium comprising at least one active isotope having a unique gain point, and said channel further has a length such as to support only a single longitudinal optical mode of said channel, said ring laser comprising means for generating discharge currents in said first and said second discharge arms, thereby producing two contratraveling light beams having an instantaneous optical beat frequency dependent on the instantaneous inertial angular rotation rate of said ring laser, $W_L$, a photo-detector for converting said optical beat frequency into an electrical instantaneous beat frequency output signal, $f_m$, and wherein an electrical reference beat frequency signal, $f_r$, corresponds to a constant reference inertial angular rotation rate, $W_0$, said ring laser further comprising a transducer for changing the dimensions of said channel in response to an electrical signal, and a heater for controlling the temperature of said ring laser;
 (b) stabilizing means which act to stabilize said optical beat frequency such that said instantaneous beat frequency signal $f_m$ remains indicative only of said instantaneous rate $W_L$ over the useful life of said ring laser;
 (c) means for linking said ring laser to said base such that said ring laser is free to rotate relative to said base;
 (d) an electro-optical coupling loop which operates to rotate said ring laser at said reference rate $W_0$;
 (e) means for detecting transient 360 degree phase-shift errors in said coupling loop;
 (f) an encoder mounted on said linking means which measures the relative angular rotation rate of said ring laser and said base and generates an output signal $f_{L/B}$; and
 (g) comparing means for continuously comparing said signal $f_{L/B}$ with a reference signal $f_0$, which corresponds to said signal $f_{L/B}$ when said ring laser is rotating at said reference rate $W_0$ and said base is inertially non-rotating, thereby providing said inertial angular orientation $\theta_B$ of said base.

5. The laser gyroscope system of claim 4 wherein said stabilizing means comprises:
 (a) detuning stabilization means which operates to detune the resonant optical frequency $\nu_a$ of said ring laser such that it is maintained at a fixed separation frequency $f_d$ from said unique gain point of said active isotope used in said ring laser medium, wherein said unique gain point represents the atomic line center of said active isotope;
 (b) gain stabilization means which operates to maintain the average drift of the single pass gain of said ring laser medium below a fixed limiting value, thereby acting to stabilize the relative excitation of said ring laser;

13

(c) mode number stabilization means which maintains said ring laser channel in a constant optimum single longitudinal optical mode; and
(d) current stabilization means which operates to maintain said discharge current in said first discharge arm and said discharge current in said second discharge arm balanced with respect to each other to within a predetermined acceptable tolerance.

6. The laser gyroscope system of claim 5 wherein said detuning stabilization means comprises an electro-optical feedback loop, further comprising in combination;
(a) a first lasing means having a gaseous medium identical to said gaseous medium of said ring laser and having a resonant optical frequency $\nu_m$ depending on the single pass gain of its medium, and wherein a resonant optical frequency $\nu_b$ is produced when said first lasing means is operated at the unique gain point of the active isotope of its medium, and further comprising a transducer for changing the dimensions of said first lasing means in response to an electrical signal;
(b) means for continually modulating said frequency $\nu_m$ between a predetermined upper and lower limit, wherein each limit set represents one-half cycle of the modulating frequency rate $f_e$;
(c) means for comparing said modulated frequency $\nu_m$ with said ring laser frequency $\nu_a$ and generating an electrical difference frequency $f_{a/m}$;
(d) a discriminator tuned at said separation frequency $f_d$ which continually compares said difference frequency $f_{a/m}$ with said separation frequency $f_d$ and generates a direct current outputs signal representing the mean difference of said difference frequency $f_{a/m}$ and said separation frequency $f_d$ with the time average covering a large number of cycles of said modulation rate $f_e$, and an alternating current output signal representing the instantaneous synchronous difference between said difference frequency $f_{a/m}$ and said separation frequency $f_d$ minus said direct current output signal;
(e) means for applying said direct current signal output to said ring laser transducer, thereby changing said ring laser dimensions such as to operate to maintain ring laser frequency $\nu_a$ at said separation frequency $f_d$;
(f) a phase sensitive detector which continually compares said alternating current signal output with an output from said modulating means and generates an instantaneous difference signal; and
(g) means for applying said instantaneous difference signal to said transducer of said first lasing means, thereby changing said first lasing means dimensions such as to operate to maintain said frequency $\nu_m$ at said frequency $\nu_b$.

7. The laser gyroscope system of claim 5 wherein said gain stabilization means comprises an electro-optical feedback loop, further comprising in combination:
(a) a second lasing means generating a light beam output and having a resonant optical frequency $\nu_c$ which is stabilized at a frequency difference from said stabilized ring laser frequency $\nu_a$ such as to prevent interaction of said light beam output with the light beam output of said ring laser;
(b) lenses for shaping and focusing said light beam output from said second lasing means;
(c) a modulator which generates an external source of applied electric field;
(d) an electro-optic deflector which receives said focused light beam from said lenses and alternately directs said beam along two separate paths L and R in response to the application of said electric field by said modulator;
(e) means for splitting said light beam in said L path into two separate parallel beams $L_1$ and $L_2$ and directing said beams such that said $L_1$ beam enters

14 said first discharge arm of said ring laser channel and said $L_2$ beam enters said second discharge arm of said ring laser channel, thereby sampling the gain of said ring laser gaseous medium in said first and said second discharge arms;
(f) means for splitting said beam in said R path into two separate parallel beams $R_1$ and $R_2$;
(g) means for attenuating said $R_1$ and $R_2$ beams at reference attenuations;
(h) optical filters for removing extraneous light from said beams $L_1, L_2, R_1, R_2$;
(i) an optical detector which alternately recombines said $L_1$ and $L_2$ beams and said $R_1$ and $R_2$ beams and generates an electrical signal representing alternately said recombined L beam and said recombined R beam;
(j) means for shifting the phase of the signal supplied by said modulator to said synchronous detector to optimize the response of said synchronous detector;
(k) a synchronous detector which detects said signal from said detector with respect to the phase shifted switching frequency of said digital modulator and generates two signals having intensities proportional to the intensities of said L beam and said R beam, respectively;
(l) a differential amplifier for comparing said L and said R beam signals and generating a difference signal; and
(m) means for integrating said difference signal to improve the signal-to-noise ratio and applying said integrated difference signal such as to control the discharge current from the discharge power supply source of said ring laser, thereby controlling the single pass gain of the gaseous medium used in said ring laser.

8. The laser gyroscope system of claim 5 wherein said mode number stabilization means comprises an electro-thermal feedback loop, further comprising in combination:
(a) an electric bridge having two arms, the current $I_r$ in one arm of which corresponds to an optimum reference temperature $t_r$ of said ring laser, and the current $I_m$ in the other arm of which corresponds to the actual measured temperature $t_m$ of said ring laser;
(b) means for comparing said current $I_r$ with said current $I_m$ and generating a difference signal;
(c) means for applying said difference signal to said heater of said ring laser, thereby operating to make said measured temperature $t_m$ correspond to said reference temperature $t_r$ to within an acceptable tolerance; and
(d) a zero level indicator which activates said detuning stabilization means when said measured temperature $t_m$ corresponds to said reference temperature $t_r$ to within said acceptable tolerance.

9. The laser gyroscope system of claim 5 wherein said current stabilization means comprises an electrical feedback loop which further comprises in combination:
(a) means for detecting the voltage $V_1$ applied across said first discharge arm of said ring laser channel;
(b) means for detecting the voltage $V_2$ applied across said second discharge arm of said ring laser channel;
(c) means for comparing said voltage $V_1$ and said voltage $V_2$ and generating a difference signal;
(d) means for integrating said difference signal to improve the signal-to-noise ratio; and
(e) means for applying said integrated difference signal to said ring laser power supply such as to maintain the difference in current in said discharge arms to within a predetermined accuracy.

10. The laser gyroscope system of claim 4 wherein said gaseous lasing medium comprises a mixture of helium-neon in the ratio 5:1, said neon further comprising equal amounts of active isotopes neon-20 and neon-22, said active isotopes having a unique gain point at the combined atomic center of said active isotopes.

11. The laser gyroscope system of claim 4 wherein said electro-optical coupling loop comprises in combination:
   (a) an oscillator adjusted at said reference beat frequency $f_r$;
   (b) a phase sensitive detector which compares said reference beat frequency $f_r$ with said instantaneous beat frequency $f_m$ and generates a difference signal; and
   (c) a torquer responsive to said difference signal which rotates said ring laser at an angular rotation rate to reduce to zero the difference between said instantaneous beat frequency $f_m$ and said reference beat frequency $f_r$.

12. The laser gyroscope system of claim 4 wherein said comparing means comprises, in combination:
   (a) a computer clock for storing said reference signal $f_0$; and
   (b) a phase sensitive detector for continuously comparing said reference signal $f_0$ with said signal $f_{L/B}$ and generating a difference signal $\theta_B$.

References Cited

UNITED STATES PATENTS

| | | |
|---|---|---|
| 3,332,314 | 7/1967 | Rosenthal. |
| 3,395,270 | 7/1968 | Speller. |
| 3,411,849 | 11/1968 | Arnowitz. |
| 3,433,568 | 3/1969 | Skalski et al. |

OTHER REFERENCES

Christiansen: "Laser Gyro comes in Quartz," Electronics, vol. 39, pp. 183–88, Sept. 19, 1966.

JEWELL H. PEDERSON, Primary Examiner

E. BAVER, Assistant Examiner

U.S. Cl. X.R.

235—150.25; 331—94.5